United States Patent [19]

Shimada et al.

[11] 4,350,289
[45] Sep. 21, 1982

[54] SELECTIVELY CONTROLLED AIR CONDITIONER OUTLET SYSTEM OF A VEHICLE

[75] Inventors: Yukio Shimada; Naoyoshi Suzuki; Toshio Ohashi, all of Yokohama; Yasushi Inoshita, Tokyo, all of Japan

[73] Assignee: Nissan Motor Co., Ltd., Yokohama, Japan

[21] Appl. No.: 206,260

[22] Filed: Nov. 12, 1980

[30] Foreign Application Priority Data

Nov. 15, 1979 [JP] Japan .................. 54-147065

[51] Int. Cl.³ ............................................. B60H 1/02
[52] U.S. Cl. .................................. 237/12.3 A; 91/357;
91/409; 165/16; 236/13
[58] Field of Search ............................. 236/13, 49, 82;
237/12.3 A; 165/25, 16; 251/26; 91/357, 409

[56] References Cited

U.S. PATENT DOCUMENTS

| 2,895,455 | 7/1959 | Clowes | 121/41 |
|---|---|---|---|
| 2,986,125 | 5/1961 | Young et al. | 121/41 |
| 3,072,108 | 1/1963 | Cripe | 91/357 |
| 3,125,001 | 3/1964 | Cripe | 91/357 |
| 3,229,588 | 1/1966 | Czernek | 91/387 |
| 3,373,934 | 3/1968 | Kolbe et al. | 236/13 |
| 3,377,022 | 4/1968 | Beatenbough et al. | 236/13 |
| 4,049,020 | 9/1977 | Neveux | 137/625.11 |
| 4,083,290 | 4/1978 | Andres | 91/357 |
| 4,262,738 | 4/1981 | Kato et al. | 165/25 |

FOREIGN PATENT DOCUMENTS

| 2512137 | 10/1976 | Fed. Rep. of Germany . |
| 1361319 | 4/1964 | France . |
| 1402736 | 5/1965 | France . |
| 1534738 | 6/1968 | France . |
| 2211893 | 7/1974 | France . |
| 2300921 | 9/1976 | France . |
| 2310513 | 12/1976 | France . |
| 2376981 | 8/1978 | France . |
| 1454003 | 10/1976 | United Kingdom . |

Primary Examiner—William E. Tapolcai, Jr.
Attorney, Agent, or Firm—Lane, Aitken, Kice & Kananen

[57] ABSTRACT

An air conditioner of a vehicle having a selectively controlled conditioned air blowing outlet system using a shift actuator (20) equipped with a number of negative pressure supplying ports (a, b, c, d), in which selection of the operation mode of the conditioner is represented by the supply of a negative pressure signal to any one of the supplying ports, which causes displacement of a piston (31) of the shift actuator (20). The displacement is conveyed to selected one or more of doors provided at the outlets via a link mechanism to control the outlets according to a predetermined program.

6 Claims, 8 Drawing Figures

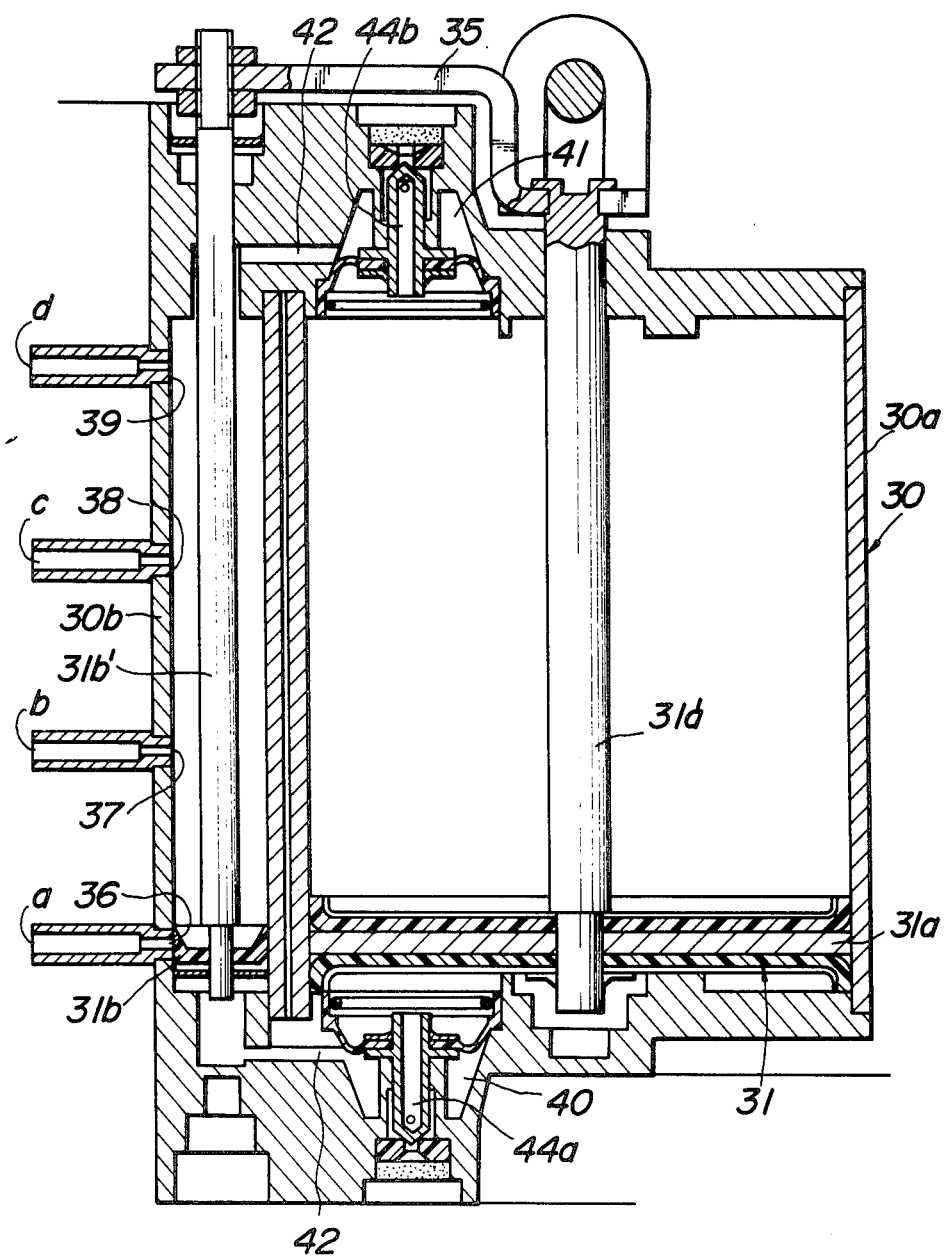

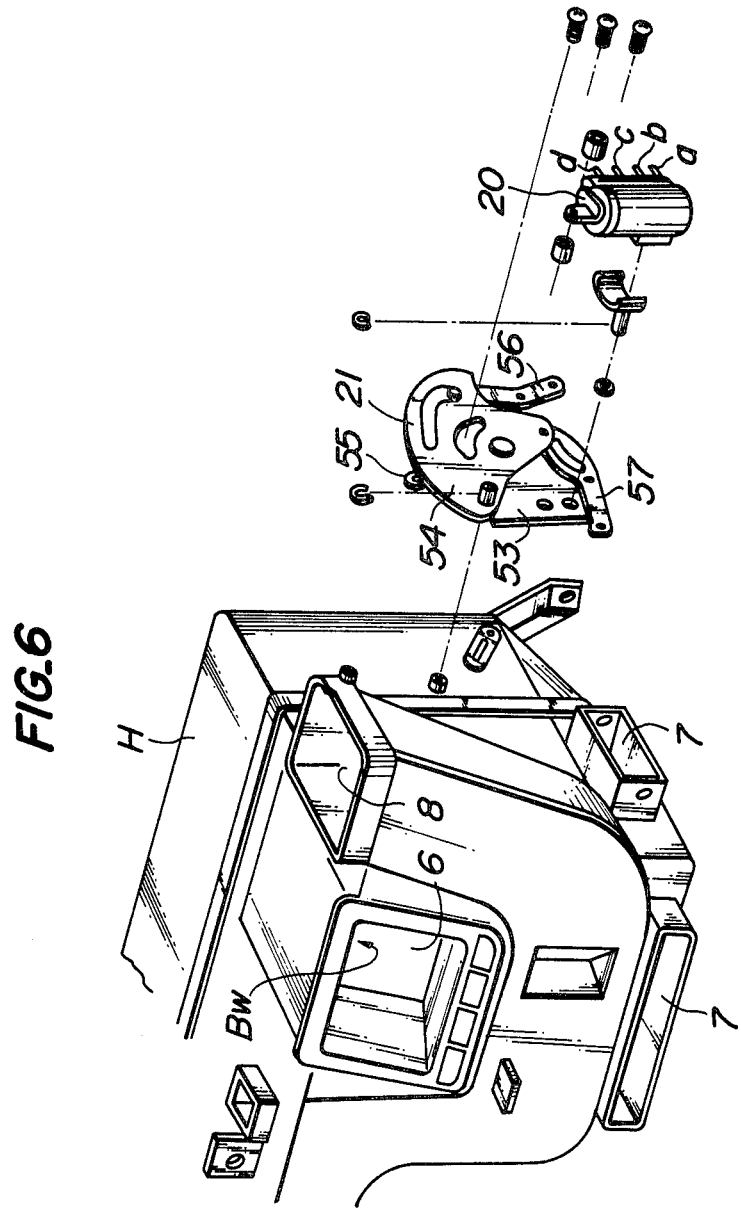

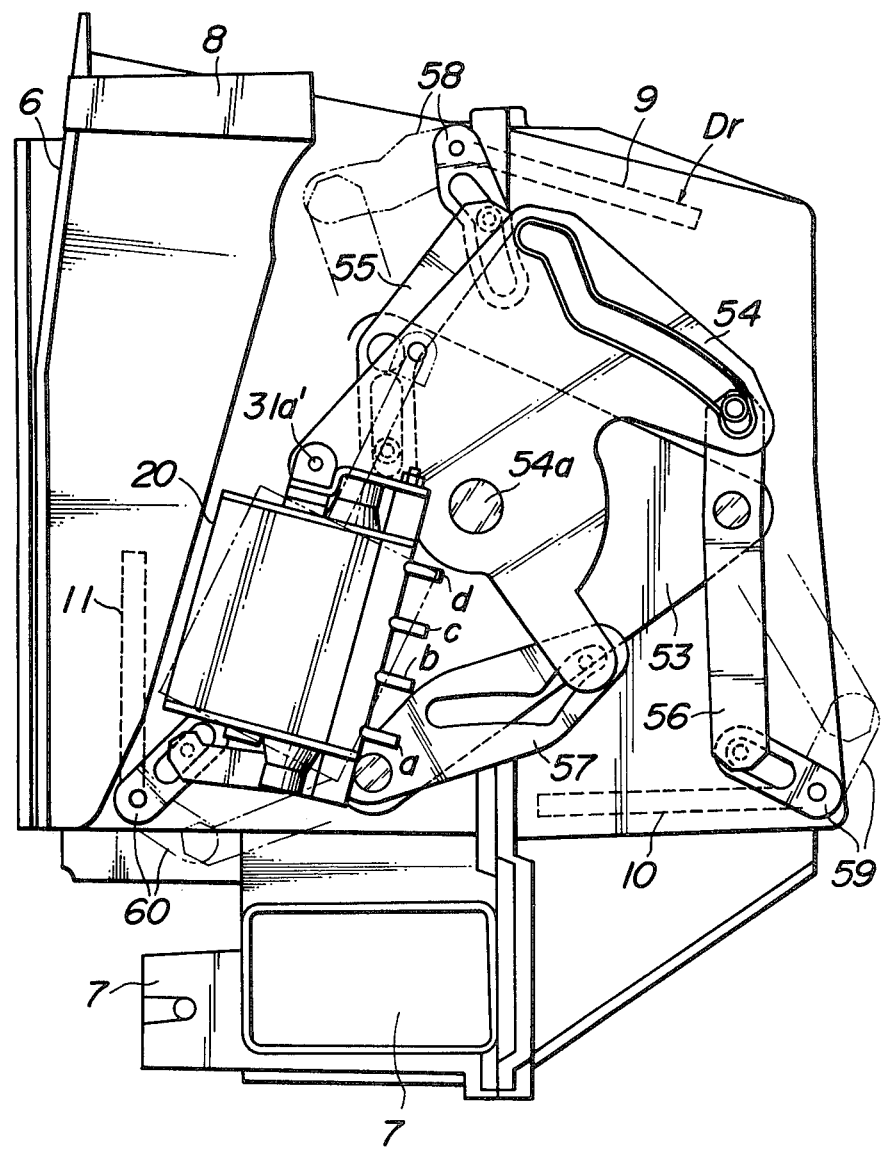

SELECTIVELY CONTROLLED AIR CONDITIONER OUTLET SYSTEM OF A VEHICLE

BACKGROUND OF THE INVENTION

The present invention generally relates to an air conditioner system of a vehicle and more particularly relates to an improvement of a selectively controlled air blowing outlet system for blowing out the conditioned air from one or more preselected outlets formed in a heater unit at a time of, for instance, heating, cooling, or defrosting.

Basic construction of an air conditioner system is shown in FIG. 1 as for an example. It generally comprises an air intake box I housing a fan 2 and an air intake door 1 for switching between an outside air introduction and inside air recirculation, a cooling unit Co housing an evaporator 3 through which a coolant circulates when a compressor (not shown) of the cooling system operates, and a heater unit H. In the heater unit H, a heater core 4, through which the engine cooling water heated by the engine circulates, and an air mixing door 5 for controlling amount of air flow passing through the heater core 4 are arranged and air of suitably adjusted temperature is formed in a mixing chamber in the heater unit by mixing a hot air flow having passed through the heater core 4 and a cold air not having passed through the heater core 4 according to the opening of the air mixing door 5. Thus formed air of suitable temperature is blown out through outlets Bw leading to various portions in the cabin of a vehicle, for instance, a ventilator outlet 6, a heater outlet 7 or a defroster outlet 8. In the figure, 9 is a ventilator door and 10 is a floor door.

In such a kind of air conditioner system, a predetermined air outlet Bw should be selected for each operation mode, such as heating, cooling, etc. A typical conventional outlet selection control system will briefly be explained by referring to FIG. 2. In the heater unit H, a respective door Dr for opening or closing each of the outlets generally indicated by Bw is provided. For instance, a ventilator door 9 is provided for the ventilator outlet 6, a floor door 10 is provided for the heater outlet and a defroster door 11 is provided for the defroster outlet, respectively. Opening or closing of these doors 9, 10 and 11 is controlled respectively by a driving device generally indicated by K and each consists of vacuum actuator 12, 13 or 14 being provided individually. Each one of the vacuum actuators 12, 13 and 14 is provided with a pair of vacuum taps as shown by a', b', c', d', e' and f' and the actuator operates stepwise by the control signals fed from two systems. The supply of negative pressure to these vacuum taps a', b', c', d', e' and f' is effected by a vacuum selector 15. This vacuum selector 15 is drum shaped and it comprises 8 positions S', V', A', B', C', D', E' and F'. The position S' is connected with a vacuum source 16 of the engine manifold negative pressure. The positions A', B', C', D', E' and F' are connected to the vacuum taps a', b', c', d', e' and f' respectively through piping system. The position V' is connected to the open air. The positions A', B', C', D', E' and F' are arranged either to communicate with the negative pressure or to the open air. The vacuum selector 15 cooperates with the mode selector according to a predetermined program to establish a desired vacuum circuit.

A more practical operation diagram of this system is illustrated in the following tables 1 to 3.

TABLE 1

| Vacuum selector | | VENT | BI-LEVEL | HEAT | DEF |
|---|---|---|---|---|---|
| Vacuum source | S' | o | o | o | o |
| open air | V' | | o | o | o |
| Position for ventilator door 9 | A' | o | o | o | o |
| | B' | o | | o | o |
| Position for floor door 10 | C' | | o | o | |
| | D' | | o | o | |
| Position for defroster door 11 | E' | o | | o | |
| | F' | o | o | | o | o-o: Communication

TABLE 2

| Vacuum actuator | | VENT | BI-LEVEL | HEAT | DEF |
|---|---|---|---|---|---|
| Position for ventilator door 9 | a' | o | o | x | x |
| | b' | o | x | x | x |
| Position for floor door 10 | c' | x | o | o | x |
| | d' | x | x | o | x |
| Position for defroster door 11 | e' | o | o | o | x |
| | f' | o | o | x | x | o: Communication with negative pressure signal
x: Open air

TABLE 3

| Door | VENT | BI-LEVEL | HEAT | DEF |
|---|---|---|---|---|
| Ventilator door 9 | Full open | Half open | Full close | Full close |
| Floor door 10 | Full close | Half open | Full open | Full close |
| Defroster door 11 | Full close | Full close | Half open | Full open |

Table 1 illustrates a program for representing the condition of the positions S', V', A', B', C', D', E' and F' of the vacuum selector 15 in case any one of the modes, i.e., ventilator mode (VENT), bi-level mode (BI-LEVEL), heat mode (HEAT) of the mode selector 17 is selected.

Table 2 illustrates the input condition of the negative pressure signal to the supply taps a, b, c, d, e and f of the vacuum actuator 12, 13 and 14 for each of the modes.

Table 3 shows the open or close condition of the doors 9, 10 and 11 for each of the modes.

In the Tables, for instance, a case when the ventilator mode (VENT) has been selected will be explained. In this case, as shown in the table 1, the positions A', B', E' and F' of the vacuum selector 15 are connected to the vacuum source 16, while the positions C' and D' are coupled to the open air. Therefore, as can be seen from tables 2 and 3, negative pressure is supplied to the supply taps a', b' and e', f' of the vacuum actuators 12 and 14, so that both these vacuum actuators 12 and 14 operate stepwise to fully open the ventilator door 9 and to fully close the defroster door 11. The negative pressure signal is not fed to the supply taps c' and d' of the vacuum actuator 13 and this vacuum actuator 13 remains unoperated and the floor door 10 is maintained in fully closed condition. Further, for example, in a heat mode (HEAT), among the supply taps e', f' of the vacuum actuator 14 for driving the defroster door 11, only the tap e' thereof is supplied with the negative pressure signal as shown in the tables 2 and 3, the vacuum actuator 14 operates one step and the defroster door 11 is settled in half-opened condition.

However, in such a kind of selectively controlled outlet system, as the means for selecting outlets Bw corresponding to the 4 modes, 3 vacuum actuators 12, 13 and 14 and a vacuum selector 15 having 8 positions S', V', A', B', C', D', E' and F' are required so that the number of lines in the piping system of the vacuum signal system becomes large and the program for setting the conditions corresponding to the modes of the positions S', V', A', B', C', D', E' and F' becomes complicated. The construction of the vacuum selector 15 itself may also becomes complicated and may not be realized by a simple mechanical overlapping of the communication ports and hence a more highly accurate controlling mechanism may be required. For instance, a three-way vacuum electromagnetic valve being controlled by an electric signal based on a program switch must be used. This results in a restriction in the space for mounting the device and it also causes an increase in the cost.

SUMMARY OF THE INVENTION

The present invention is based on the aforementioned recognition and it has an object to realize a selectively controlled system of outlets of a vehicle mounted air conditioner having simplified vacuum signalling system in which the piping arrangement of the vacuum signalling system can be decreased. The construction of the vacuum selector is simplified by the introduction of a shift actuator as the driving device of the doors for selecting the outlets and by controlling the operation of the shift actuator by means of one directional negative pressure and by moving each door by the operation of the shift actuator via a link mechanism.

EXPLANATION OF THE DRAWINGS

FIG. 4 is a cross-sectional view of a shift actuator shown in FIG. 3;

FIG. 5a and FIG. 5b are cross-sectional views for showing operation of an open air valve, in which FIG. 5a shows an opened condition to the open air and FIG. 5b shows a shut out condition of the same;

FIG. 6 is a perspective view for showing the link mechanism and the mounting position of the shift actuator; and FIG. 7 is a cross-sectional view for showing the linked operation of the link mechanism and the shift actuator.

DESCRIPTION OF THE PREFERRED EMBODIMENT

Figure 3:
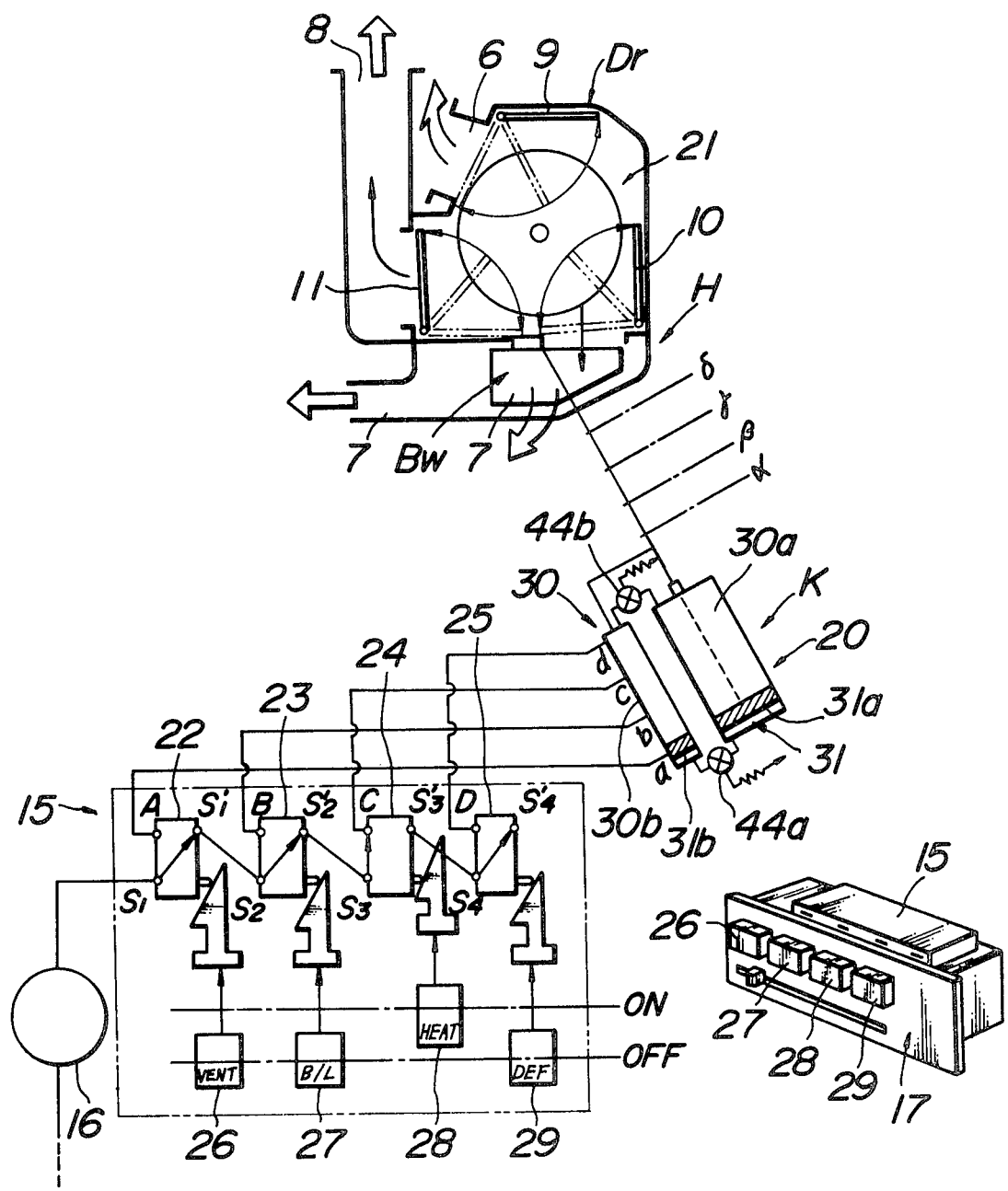
FIG. 3 is a simplified diagram for showing a selectively controlled outlet system according to one embodiment of the present invention.

The invention will now be described in more detail by referring to an embodiment thereof illustrated in the accompanying drawings:

In the embodiment of the selectively controlled outlet system of the present invention as shown in FIG. 3, the system basically comprises a vacuum selector 15 cooperating with a mode selector 17, a shift actuator 20 operating under supply of the negative pressure signal selected by said vacuum selector 15, and a link mechanism 21 for transferring the output of the shift actuator 20 in a predetermined condition to the doors 9, 10 and 11.

In this embodiment, the vacuum selector 15 comprises 4 vacuum switches 22, 23, 24 and 25. Each one of the vacuum switches 22, 23, 24 and 25 comprises, respectively one input position $S_1$, $S_2$, $S_3$ or $S_4$ and two output positions A, $S_1'$; B, $S_2'$; C, $S_3'$; or D, $S_4'$. The input position $S_1$ of the vacuum switch 22 is connected to the vacuum source 16 of negative pressure of the engine manifold. The output positions $S_1'$, $S_2'$ and $S_3'$ are connected to input positions $S_2$, $S_3$ and $S_4$, respectively. When all of the mode selection buttons of the mode selector 17, i.e. the ventilator button 26, the bi-level button 27, the heat button 28, and the defroster button 29 are in OFF condition, the output positions $S_1'$, $S_2'$, $S_3'$ and $S_4'$ are all coupled to communicated with the negative pressure. Whereas if the heat button 28 is depressed to be in the ON condition, only the output position C is coupled to the negative pressure.

The shift actuator 20 is the essential portion of the driving device K for driving one or more of the respective doors, the detail of which is shown in FIG. 4. It comprises a vacuum cylinder 30 having a main vacuum cylinder portion 30a and a distributor cylinder portion 30b separated therefrom, and a piston 31 (in this embodiment, pistons 31a and 31b) arranged freely slidably in the respective cylinders 30a and 30b. Piston rods 31a' and 31b' of the pistons 31a and 31b are coupled at their base ends by means of a coupling plate 35 so that both the pistons 31a and 31b are linked together. In the distributor cylinder portion 30b, pressure supply holes 36, 37, 38 and 39 for determining the stopping position of the piston 31b are opened. Againt these supply holes 36, 37, 38 and 39, supply taps a, b, c and d are mounted. These supply taps a, b, c and d are connected with the positions A, B, C and D of the vacuum selector 15 shown in FIG. 3 via piping systems. When a predetermined position A, B, C or D is in a negative pressure supply condition, a corresponding negative pressure signal is supplied in the distributor cylinder portion 30b through the predetermined supply tap a, b, c or d. On the other hand, the main vacuum cylinder portion 30a is provided with pressure detecting chambers 40 and 41 at upper and lower ends thereof. These pressure detecting chambers 40 and 41 are arranged in communication with the distributor cylinder portion 30b through negative pressure introducing holes 42 and 42 and at the same time they are in connection with the main vacuum cylinder portion 30a through introducing passageways 43 and 43. At both of the pressure detecting chambers 40 and 41, open air releasing valves 44a and 44b having the same construction are provided.

Figure 5A:
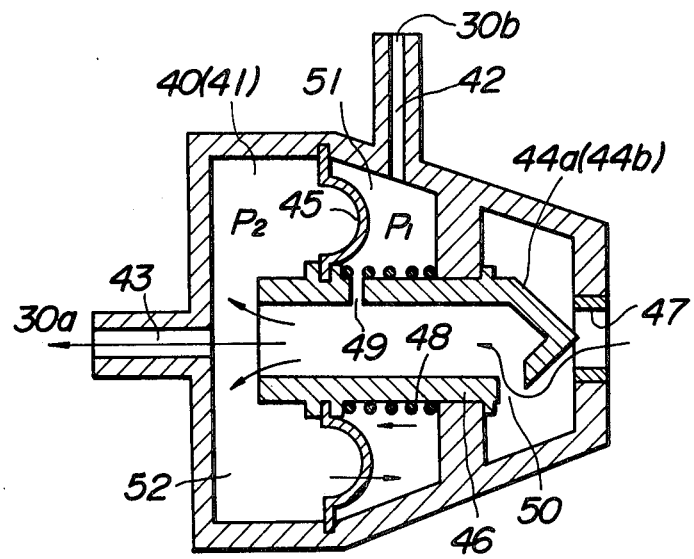
Figure 5B:
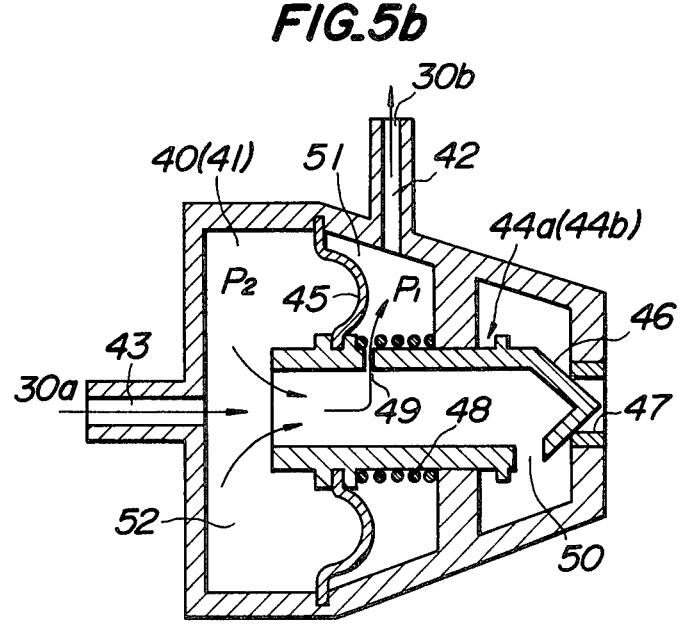

Detail of the chamber 40 or 41 with the open air releasing valve 44a or 44b is shown in FIGS. 5a and 5b. It comprises a pressure receiving diaphragm 45, a needle valve 46 fixed with the pressure receiving diaphragm 45, a valve seat 47 being shut by the needle valve 46 and communicating with open air, and a spring 48 for supplying a bias force to the needle valve 46 towards the pressure receiving diaphragm 45. Furthermore, a bleed port 49 for introducing the negative pressure signal into the main vacuum cylinder 30a and an open air communicating hole 50 for introducing the open air pressure into the main vacuum cylinder 30a are provided on the needle valve 46.

The operation of the open air releasing valve 44a or 44b will be explained.

When the supply of the negative pressure signal to the negative pressure introducing hole 42 is cut, the needle valve 46 occupies a position as shown in FIG. 5a. Namely, in this condition, pressure $P_1$ in the negative pressure introducing chamber 51 becomes equal with pressure $P_2$ in a negative pressure chamber 52 formed between the pressure receiving diaphragm 45 and the main vacuum cylinder 30a through the bleed port 49, so that by the bias force of the spring 48, the needle valve 46 is moved leftwardly in the drawing shown by an arrow mark to allow the open air to freely flow into the chamber through the valve seat 47. The outward open air thus flows into the main vacuum cylinder through the open air communicating hole 50 and the introducing passageway 43 and causes discontinuation of the movement of the piston 31a.

On the contrary, if the negative pressure signal is supplied to the negative pressure introducing hole 42 as shown in FIG. 5b, the pressure $P_1$ in the negative pressure introducing chamber 51 becomes nearly equal with pressure Ps of the vacuum source 16, whereas the pressure $P_2$ in the pressure receiving chamber 52 is reduced by the action of the bleed port 49 and by the air flow resistance of the bleed port 49 the pressure $P_1$ and the pressure $P_2$ having the relation of $P_2 > P_1$. Under this condition, the difference pressure between $P_2$ and $P_1$ is applied on the pressure receiving diaphragm 45 in a direction opposite to the bias force caused by the spring 48. When the difference pressure exceeds the bias force of the spring 48, the pressure receiving diaphragm 45 displaces and the needle valve 46 is driven rightwardly to close the valve seat 47 to interrupt the introduction of the outside open air so that the negative pressure signal introduced through the negative pressure introducing hole 42 acts to decrease the pressure in the main vacuum cylinder 30a and to actuate the piston 31a.

As has been explained in the foregoing according to the shift actuator 20 of the present invention, when the heat button 28 in the mode selector 17 shown in FIG. 3 is depressed to be in the ON condition, the position C of the vacuum switch 24 of the vacuum selector 15 becomes a condition to introduce the negative pressure so that the distributor cylinder 30a is supplied with a unidirectional negative pressure signal through supply tap c. In this condition, one of the open air releasing valves, the valve 44b in the illustrated case, is in a condition to cut off the open air as shown in FIG. 5b and the distributor cylinder portion 30b is in communication with the main vacuum cylinder portion 30a so that the distributor cylinder portion 30b in which the supply tap c is located and the main vacuum cylinder 30a incur a negative pressure condition and the pistons 31a and 31b are pulled towards the position where the supply tap c is located. The other open air releasing valve 44a is in open air communicating condition as shown in FIG. 5a to communicate with the open air so that the distributor cylinder portion 30b in the side of said open air releasing valve 44a and the main vacuum cylinder portion 30a attain equal pressure with the open air so that the pistons 31a and 31b are depressed towards the position where the supply tap c is located. Accordingly, the pistons 31a and 31b jointly move to the position of the supply tap c and the supply hole 38 of this supply tap c is closed by the piston 31b when the piston has moved to the position of the supply tap c and introduction of the negative pressure through this supply tap c is interrupted. In this case, said first open air release valve 44b opens to communicate with the open air as can be seen from FIG. 5a so that all of the distributor cylinder portion 30b and all of the main vacuum cylinder 30a reach an equal pressure condition with the open air and the movement of the pistons 31a and 31b is discontinued.

As has been explained in the foregoing by the shift actuator 20 of the present invention, it is thus possible to effect the position control of the piston 31a and 31b in response to the selected mode. Namely, when the ventilator mode (VENT) is selected, the pistons 31a and 31b are moved to the position of the supply tap a; when the bi-level mode (B/L) is selected, the pistons 31a and 31b are moved to the position of the supply tap b; for the selection of the heat mode (HEAT), the pistons 31a and 31b are moved to the position c as mentioned above; and when the defroster mode (DEF) is selected, the pistons 31a and 31b are moved to the position of supply tap d. The base end of the piston rod 31a' occupies corresponding positions to meet the ports a to d as indicated diagrammatically in FIG. 3 by $\alpha$, $\beta$, $\gamma$ and $\delta$.

The link mechanism 21 for moving the doors 9, 10 and 11 is shown in detail in FIG. 6 and FIG. 7. The mechanism 21 comprises a base plate 53 mounted on the outer side surface of the heater unit H, a rotating link 54 pivoted on a shaft 54a provided on the base plate 53 and first to third rotating levers 55, 56 and 57 cooperating with the rotating motion of said rotating link 54 and pivoted on the base plate 53 in a freely rotating manner. The moving ends of the rotating levers 55, 56 and 57 are respectively coupled to respective jointing pieces 58, 59 and 60 fixed on the rotating axes of the ventilator door 9, the floor door 10 and the defroster door 11. The rotating link 54, the rotating levers 55, 56 and 57, and the jointing pieces 58, 59 and 60 are arranged to give predetermined operation by engagement of a fixing pin on respective slits of predetermined shape. The shift actuator 20 is held on the base plate 53 in a freely rotatable manner. The top end of the piston rod 31a' of the main vacuum cylinder portion 30a of the shift actuator 20 is coupled to the rotating link 54 to operate the link mechanism 21 in a predetermined mode according to the operation of the piston rod 31a'. For instance, as can be seen from FIG. 3, if the mode selector 17 is set in a ventilator mode (VENT), the pistons 31a and 31b of the shift actuator 20 move at the position of the supply tap a and the tops of the piston rods 31a and 31b move to the corresponding location $\alpha$. In this case, the movement of the piston rod 31a' is conveyed to each of the jointing pieces 58, 59 and 60 via the link mechanism 21. The jointing pieces 58, 59 and 60 are held at position the indicated by solid lines in FIG. 7. By this the ventilator door 9 and the floor door 10 are made fully opened and the defroster door 11 is made fully closed.

When the mode selector 17 shown in FIG. 3 is set in the defroster mode (DEF), the pistons 31a and 31b of the shift actuator 20 move to the position of the supply tap d and the top of the piston rod 31a' moves to the corresponding position δ. In this case, the jointing pieces 58, 59 and 60 occupy the position shown by dash-dot line in FIG. 7 to fully close the ventilator door 9 and the floor door 10 and at the same time to fully open the defroster door 11. In the other modes of operation the doors 9, 10 and 11 are set in predetermined conditions under the same operating principle.

According to the selectively controlled outlet system of this embodiment of the present invention, the doors 9, 10 and 11 may be set in the predetermined condition for the respective mode under a program illustrated in table 4 to table 6.

TABLE 4

| Vacuum selector | | Mode | | | |
|---|---|---|---|---|---|
| | | VENT | BI-LEVEL | HEAT | DEF |
| Vacuum source | S | o | o | o | o |
| Vacuum switch 22 | A | o | | | |
| Vacuum switch 23 | B | | o | | |
| Vacuum switch 24 | C | | | o | |
| Vacuum switch 25 | D | | | | o | o-o Communication

TABLE 5

| Shift actuator | Mode | | | |
|---|---|---|---|---|
| | VENT | BI-LEVEL | HEAT | DEF |
| Supply tap a | o | | | |
| Supply tap b | | o | | |
| Supply tap c | | | o | |
| Supply tap d | | | | o | o: Negative pressure signal communication

TABLE 6

| Door | Mode | | | |
|---|---|---|---|---|
| | VENT | BI-LEVEL | HEAT | DEF |
| Ventilator door 9 | Full open | Half open | Full close | Full close |
| Floor door 10 | Full open | Half open | Full open | Full close |
| Defroster door 11 | Full close | Full close | Full open | Full open |

The above tables 4 to 6 are comparable with the tables 1 to 3 showing the operational program of the conventional outlet selectively controlling system.

Table 4 shows a program representing the condition of the positions A, B, C and D of the vacuum selector 15 in the case of any one of the modes of the mode selector 17 being selected.

Table 5 shows input conditions for the supply taps a, b, c and d of the shift actuator 20.

Table 6 shows the open or close condition of the doors 9, 10 and 11 for the respective mode selected.

Referring the above tables, as for an example, a case of selection of the ventilator mode (VENT) will be explained further.

As can be seen from the table 4, position A of the vacuum switch 22 is communicated with the vacuum source S and is in the negative pressure condition. This negative pressure signal is conveyed to the supply tap a as seen from the table 5. As a result, the shift actuator operates to shift its position at a point corresponding to the above supply tap a and it acts to fully open the ventilator door 9 and the floor door 10 and to fully close the defroster door 11 as is shown in the table 6.

In the case of selection of the other modes, the doors 9, 10 and 11 are set at predetermined conditions based on the same principle.

As has been mentioned in the foregoing, according to the present selectively controlled outlet system, as the means for selecting 4 kinds of outlets Bw corresponding to the 4 kinds of modes like ventilator mode and others, a vacuum selector 15 is provided, which has 4 positions A, B, C and D being sufficient for the operation. Either one of the 4 positions A, B, C and D may assume the negative pressure communication condition to fulfil the required operation and these positions need not assume an open air communicating condition. Accordingly, the program for the condition of the positions A, B, C and D of the vacuum selector 15 for each of the modes becomes more simple and thus the vacuum selector 15 may be formed of a group of vacuum switches 22, 23, 24 and 25. Therefore, the mode selector 17 can be constructed from a push button type device.

Figure 1:
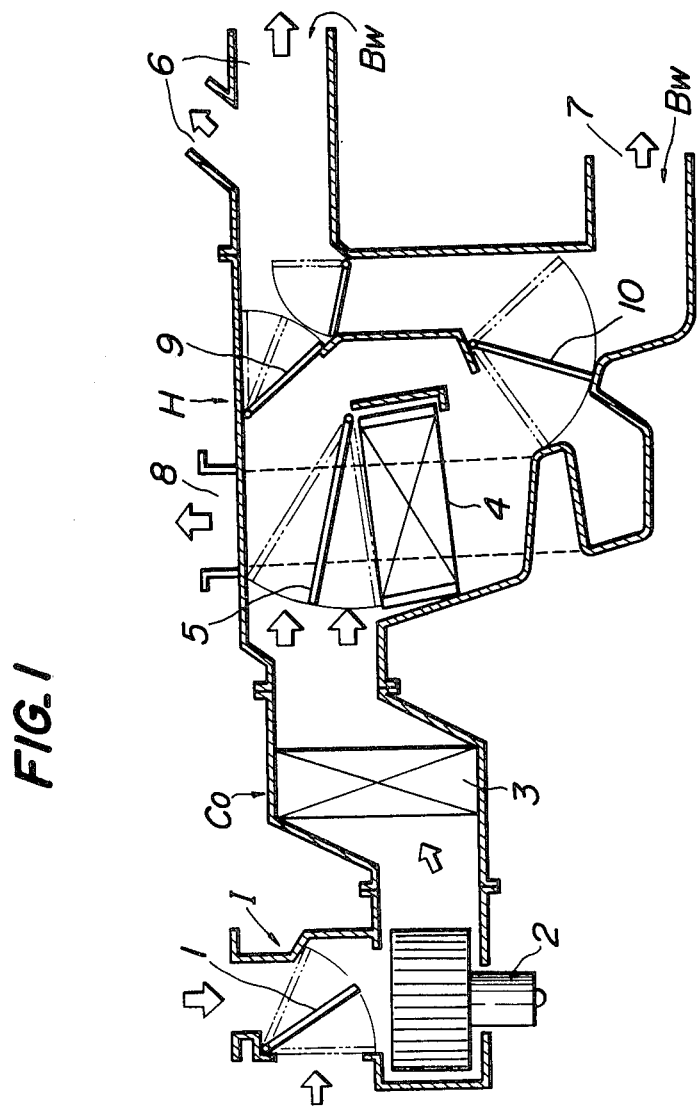
FIG. 1 is an explanatory diagram for showing the outline of a vehicle mounted air conditioner device, which has been explained in the foregoing.
Figure 2:
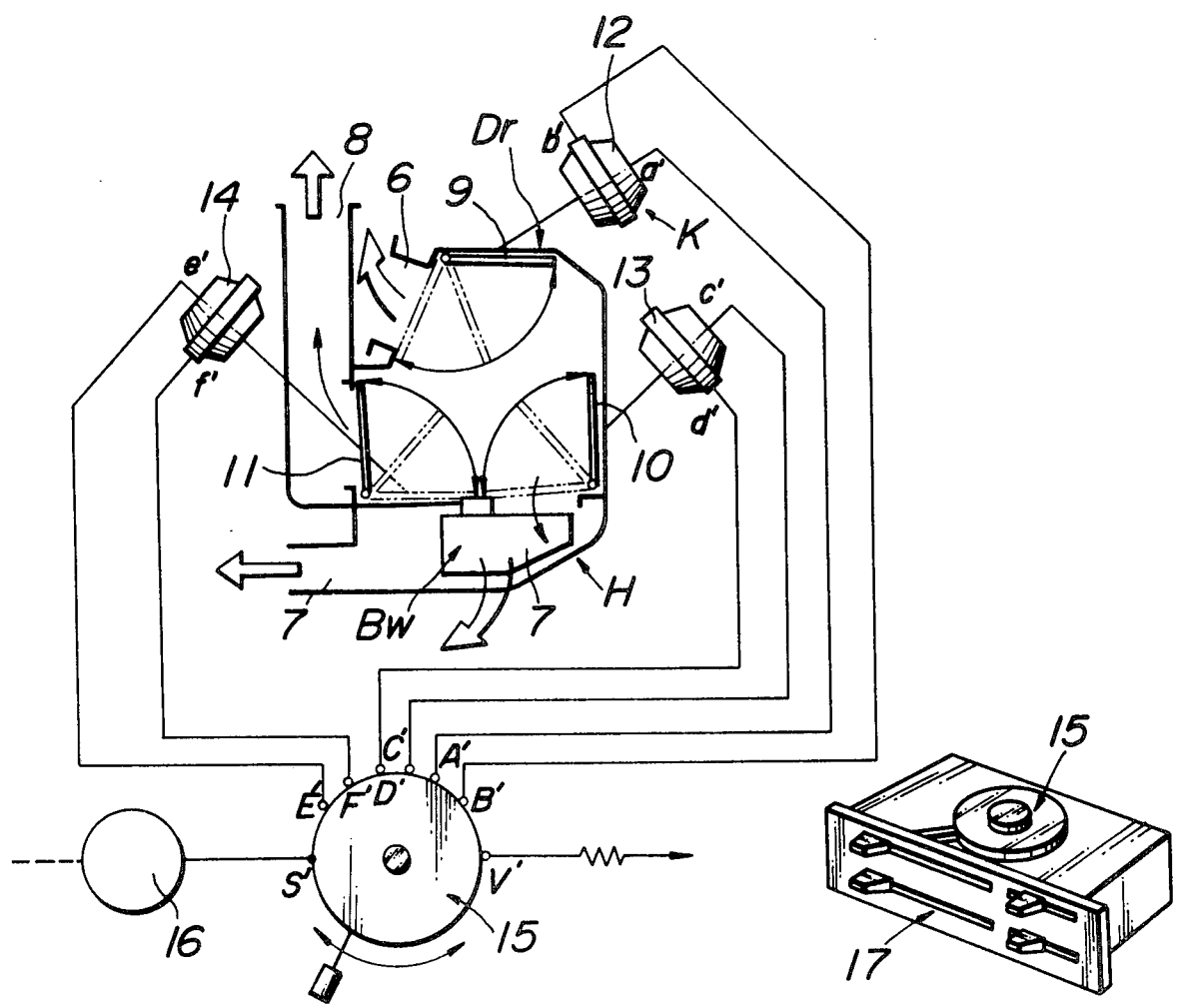
FIG. 2 is a simplified diagram for showing one example of a conventional selectively controlled outlet system of a vehicle mounted air conditioner, which also has been explained above.

Further to match the number of the positions A, B, C and D of the vacuum selector 15, the number of lines in the piping system of the vacuum pressure signal can be decreased to a number of four. This is a substantial decrease of the number of piping systems if compared with the conventional system shown in FIG. 2. As the driving device K for driving the door Dr, the shift actuator 20 is used instead of conventional devices like vacuum actuators, and a multi-level position control becomes possible by using the supply of uni-directional negative pressure signal only. Moreover, the movement of the piston of the shift actuator 20 is conveyed to the doors 9, 10 and 11 via the link mechanism so that only one shift actuator is needed. This greatly contributes for the simplification of the control system.

When an increase of the number of modes is requested, the control steps of positions of the shift actuator 20 may be increased correspondingly and the link mechanism 21 may be modified to match the increase of the steps.

As has been explained in the foregoing, according to the inventive selectively controlled air condition outlet system, a shift actuator is used as a driving device for actuating the door for selecting the blowing outlet; the operation of the shift actuator is multi-level, controlled by means of uni-directional negative pressure signal only; and the displacement of the actuator is conveyed to each door via a link mechanism so that it is no longer required to operate a separate vacuum actuator for operating each door, as has been done in the conventional system. This can eliminate the necessity of complicated construction of the vacuum selector and is effective to decrease the number of lines in the piping system in the vacuum pressure signalling system. Thus, the vacuum selector can greatly be simplified in the construction and also the whole system can be simplified and economized.

What is claimed is:

1. In a selectively controlled air conditioner outlet system for an air conditioner including a heater unit (H), said system provided with blowing outlets (Bw) for blowing out conditioned air to various portions of a cabin of a vehicle, a door (Dr) for controlling the amount of the blowing out conditioned air for each one of the blowing outlets (Bw), a vacuum source (16), and a driving device (K) coupled thereto through a vacuum selector (15), wherein by selection on the vacuum selector (15), the driving device (K) is operated in a predetermined condition and, by the driving device (K), the degree of opening of said doors (Dr) can be controlled, the improvement comprises that the driving device (K) is formed of a shift actuator (20) having a vacuum cylinder (30) and a piston (31), and the vacuum selector (15) is provided with a plurality of selecting buttons (26) (27) (28) (29) and a corresponding number of vacuum switches (22) (23) (24) (25), that said vacuum cylinder (30) is provided with a plurality of supply taps (a) (b) (c) (d) for supplying a unidirectional negative pressure signal only at one location corresponding to a position of one of a plurality of predetermined positions (A) (B) (C) (D) obtained by depressing one of the selecting buttons of the vacuum selector (15), and that the outlet system includes means for supplying the negative pressure signal to none of the supply taps when none of the selecting buttons is depresssed and for supplying the negative pressure signal to any one of the supply taps when a corresponding one of the selecting buttons is depressed, means for shifting the piston to a predetermined position when the negative pressure signal is supplied to any one of the supply taps, and a link mechanism connecting the piston to the doors, for moving predetermined one or more doors to a predetermined condition in response to the movement of the piston.

2. A selectively controlled air conditioner outlet system as claimed in claim 1, wherein the shift actuator (20) comprises two vacuum cylinders, one of which is a main vacuum cylinder portion (30a) accommodating piston (31a) and the other one is a distributor cylinder (30b) accommodating a piston (31b), the two pistons (31a) and (31b) being linked together mechanically.

3. A selectively controlled air conditioner outlet system as claimed in claim 2, wherein the distributor cylinder (30b) is provided with ports (a) (b) (c) (d) with respective negative pressure supply holes (36) (37) (38) (39) for defining the stopping position of the pistons (31a, 31b).

4. A selectively controlled air conditioner outlet system as claimed in claim 3, wherein the main vacuum cylinder (30a) comprises at both stroke ends respective pressure detecting chambers (40 and 41).

5. A selectively controlled air conditioner outlet system as claimed in claim 4, wherein the pressure detecting chambers (40, 41) act to detect pressure difference by a bleed port (49).

6. A selectively controlled air conditioner outlet system as claimed in claim 4, wherein each pressure detecting chamber (40, 41) is provided with an open air releasing valve (44a, 44b).

* * * * *